United States Patent
Cheron et al.

(12) 
(10) Patent No.: US 6,547,317 B1
(45) Date of Patent: Apr. 15, 2003

(54) MOTOR VEHICLE STRUCTURAL COMPONENT, ESPECIALLY A SPECIALIZED FRONT WALL

(75) Inventors: Hugues Cheron, Mexmieux (FR); Frederic Copier, Lagnieu (FR); Johnny Busolin, Maillat (FR); Yves Alphand, Oyonnax (FR); Fredereic Pierrot, Lagnieu (FR)

(73) Assignee: Compagnie Plastic Omnium S.A., Lyons (FR)

(*) Notice: Subject to any disclaimer, the term of this patent is extended or adjusted under 35 U.S.C. 154(b) by 0 days.

(21) Appl. No.: 09/694,684

(22) Filed: Oct. 24, 2000

(30) Foreign Application Priority Data

Oct. 25, 1999 (FR) .............................. 99 13286

(51) Int. Cl.[7] .................. B62D 25/08; F16B 21/09
(52) U.S. Cl. ............... 296/194; 296/203.02; 296/901; 24/297; 24/324; 24/662; 411/525; 180/68.4
(58) Field of Search ................... 296/29, 194, 203.02, 296/901; 24/297, 324, 662, 573.3; 411/525, 526; 180/68.4

(56) References Cited

U.S. PATENT DOCUMENTS

| | | | | |
|---|---|---|---|---|
| 2,568,584 A | * | 9/1951 | Hartman ..................... | 411/525 |
| 3,926,463 A | * | 12/1975 | Landwehr et al. ........... | 293/136 |
| 4,406,489 A | * | 9/1983 | Trabert ........................ | 293/115 |
| 4,763,723 A | * | 8/1988 | Granetzke .................... | 165/67 |
| 5,544,928 A | * | 8/1996 | Mori et al. .................. | 296/97.9 |
| 5,575,526 A | * | 11/1996 | Wycech ....................... | 296/205 |
| 5,580,122 A | * | 12/1996 | Muehlhausen ............... | 296/194 |
| 5,658,041 A | * | 8/1997 | Girardot et al. ............. | 296/194 |
| 5,988,678 A | * | 11/1999 | Nakamura et al. .......... | 280/751 |
| 6,158,500 A | * | 12/2000 | Heine .......................... | 165/67 |
| 6,186,583 B1 | * | 2/2001 | Martin ........................ | 296/194 |
| 6,189,958 B1 | * | 2/2001 | Guyomard et al. ......... | 296/194 |
| 6,412,855 B1 | * | 7/2002 | Cantineau et al. .......... | 296/194 |

FOREIGN PATENT DOCUMENTS

EP        0 370 342 B1     5/1990

* cited by examiner

Primary Examiner—D. Glenn Dayoan
Assistant Examiner—Paul Chenevert
(74) Attorney, Agent, or Firm—Oliff & Berridge, PLC

(57) ABSTRACT

The invention relates to a motor vehicle structural component, especially a specialized front wall, comprising a functional part made of molded plastic intended to support functional members of the vehicle and a structural part intended to withstand the various mechanical stresses generated by the use of the vehicle, the structural part consisting of the combination of two rigid assemblies, namely, in the first place, an array of stiffening ribs and, in the second place, metal reinforcements.

The functional part and one of the rigid assemblies are made as one piece when molding the plastic functional part, while the other rigid assembly is attached to the first rigid assembly to which it is fixed by snap-fastening.

2 Claims, 8 Drawing Sheets

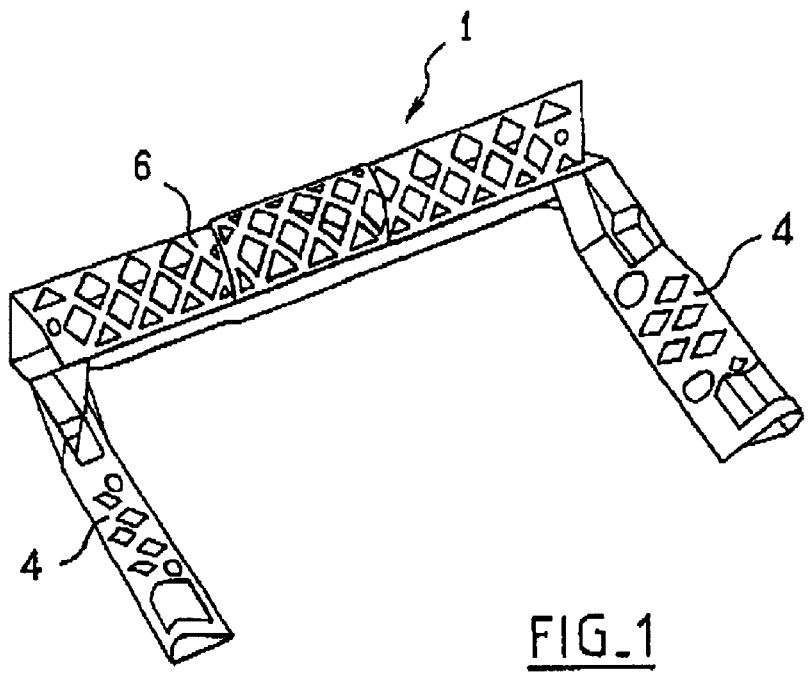
FIG_1
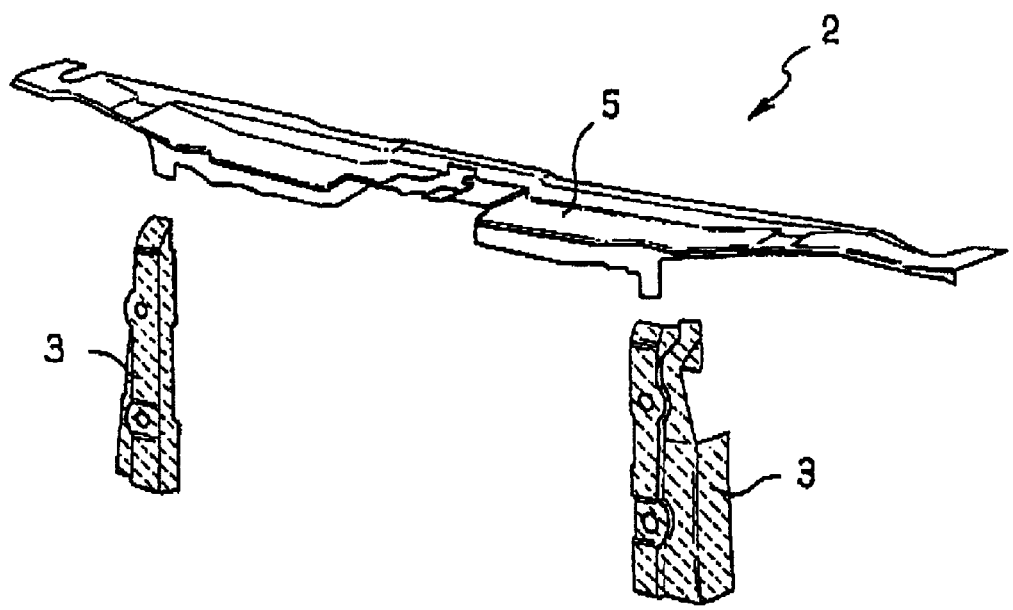
FIG_2

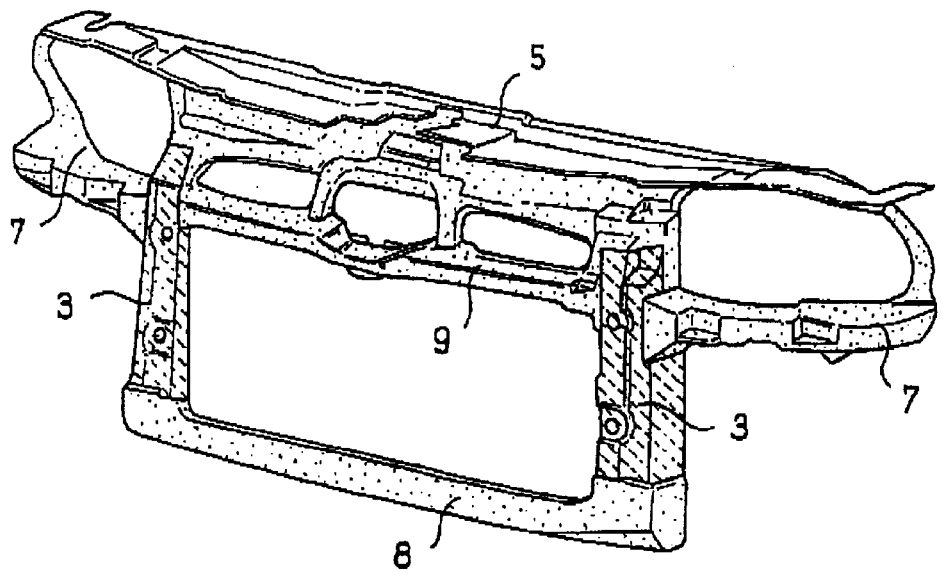
FIG_3
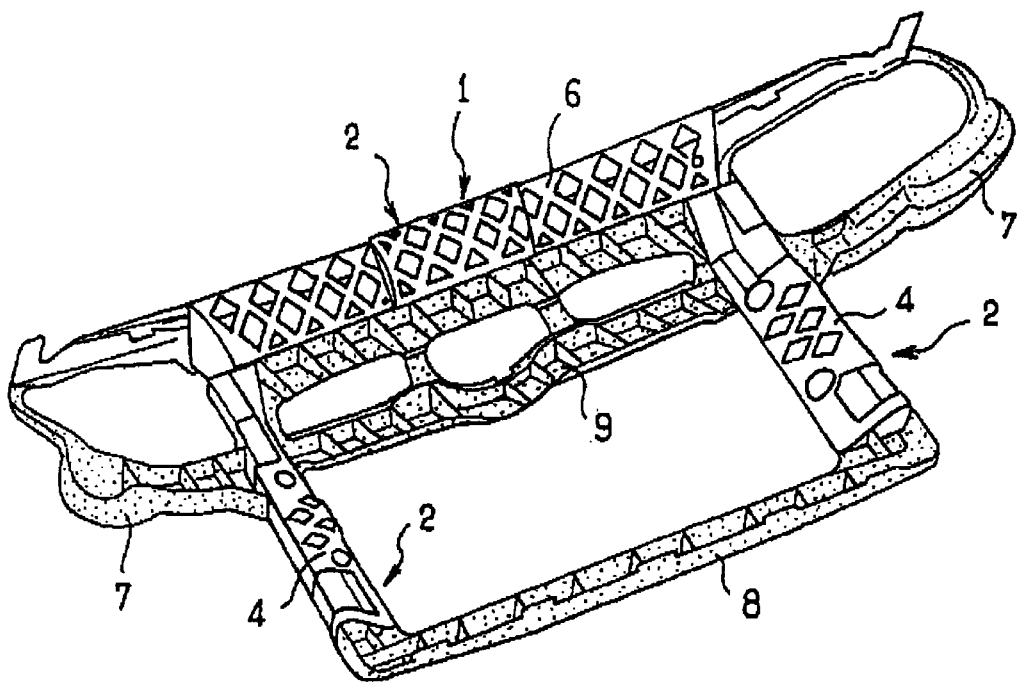
FIG_4

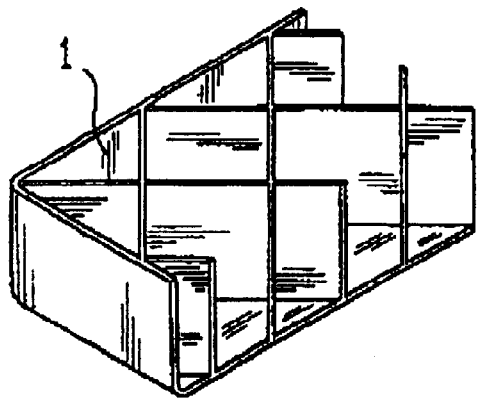
FIG_8
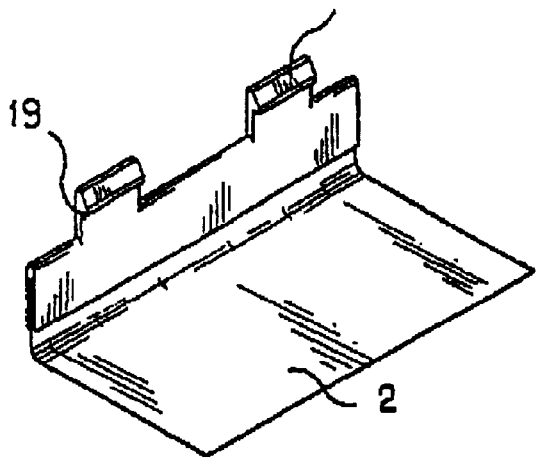
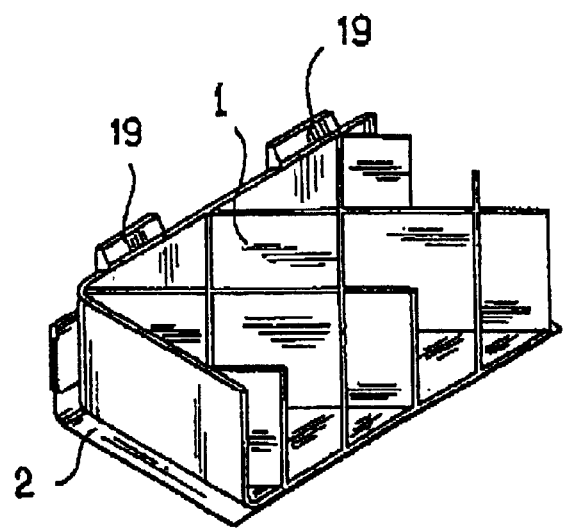
FIG_9

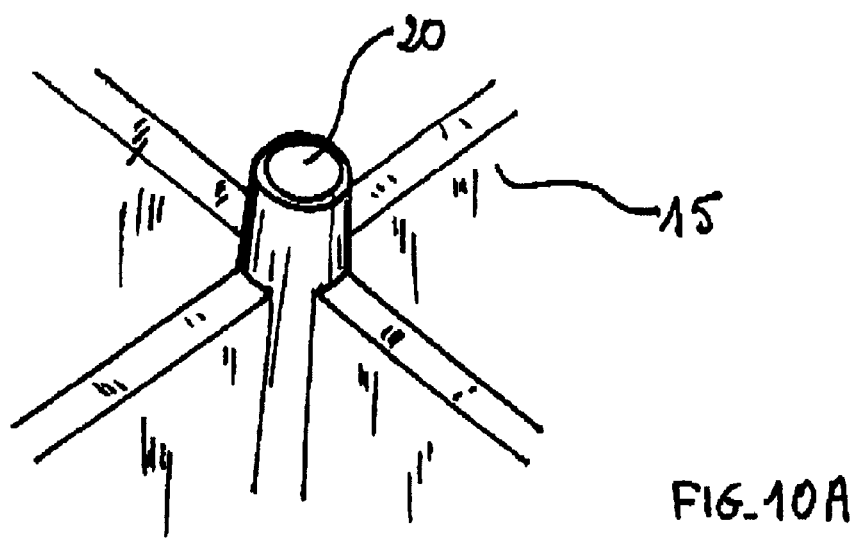
FIG_10A
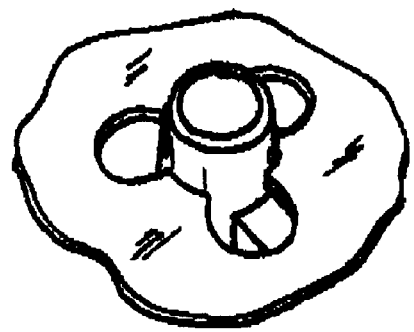
FIG_10C
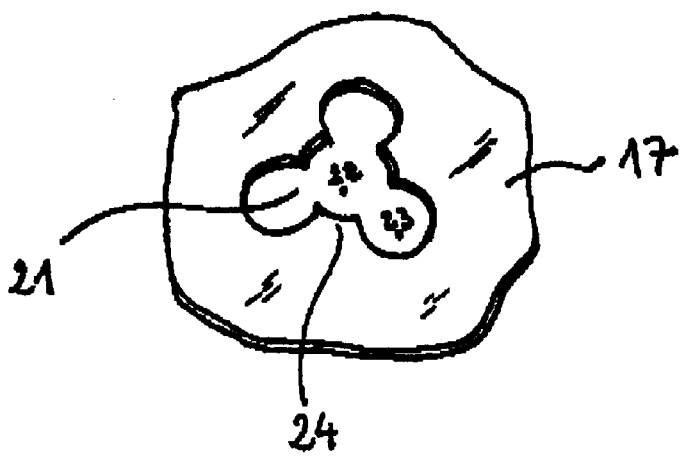
FIG_10B

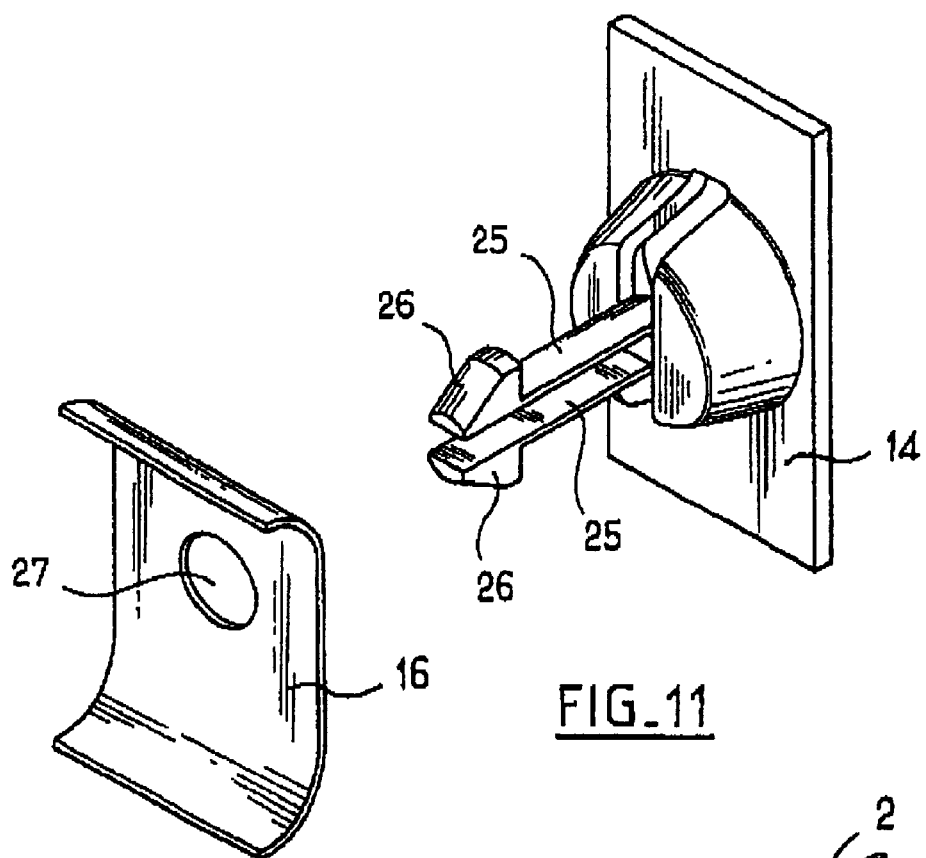
FIG_11
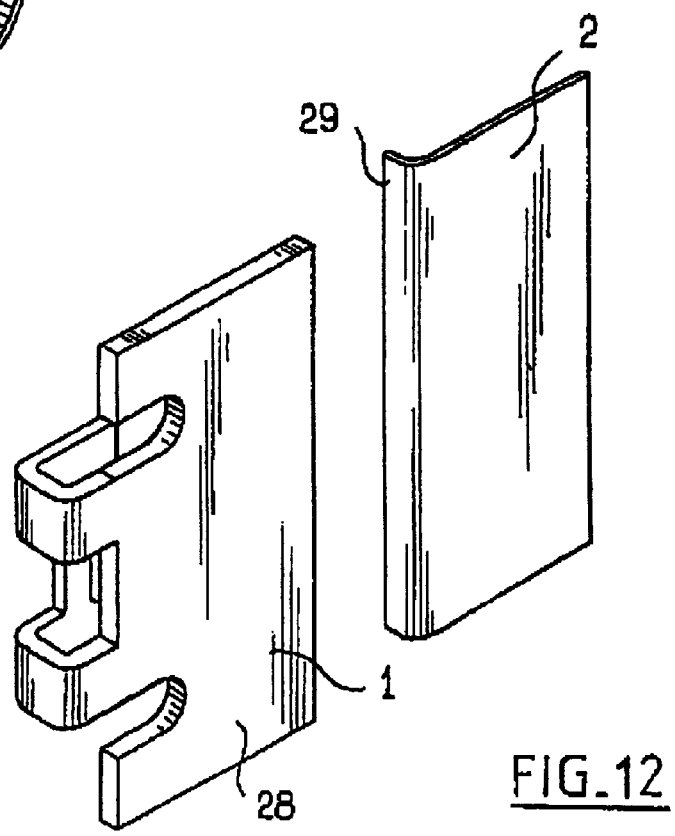
FIG_12

MOTOR VEHICLE STRUCTURAL COMPONENT, ESPECIALLY A SPECIALIZED FRONT WALL

BACKGROUND OF THE INVENTION

The present invention relates to a motor vehicle structural component, especially a specialized front wall.

Document EP-370,342-B1 teaches a hybrid structural component comprising a basic body in the form of a shell containing plastic ribs.

These ribs are obtained by injection moulding a plastic, when overmoulding the shell. This plastic passes through perforations in the shell and extends beyond the external face of the said shell, thus definitively fastening the ribs to the shell.

This structural component is complex to produce both because the overmoulding process with projection of material is difficult to implement and because the shell by itself may not have s simple shape.

As a result, the manufacturing cost of such a component is relatively high.

In addition, EP-370,342-B1 does not envisage the case of a structural component having a part serving for receiving functional members, as is the case for a specialized front wall of a motor vehicle, which must especially house the vehicle's optical systems and, for example, the radiator, a lock and wipers for the optical systems.

SUMMARY OF THE INVENTION

The object of the present invention is to provide a structural component of different construction, of which the constitutive parts, and especially those corresponding to the shell of the prior art, are simpler to produce, and which employs a manufacturing process which is also simpler.

The subject of the present invention is a motor vehicle structural component, especially a specialized front wall, comprising a functional part made of moulded plastic intended to support functional members of the vehicle and a structural part intended to withstand the various mechanical stresses generated by the use of the vehicle, this structural part consisting of the combination of two rigid assemblies, namely, in the first place, an array of stiffening ribs and, in the second place, metal reinforcements, the structural component being characterized in that the functional part and one of the rigid assemblies are made as one piece when moulding the plastic functional part, while the other rigid assembly is attached to the first rigid assembly to which it is fixed by snap-fastening.

The structural component according to the invention is thus produced in two steps.

Firstly, its functional part and one of the rigid assemblies are formed and then, secondly, the other rigid assembly is joined to the first.

In a first embodiment of the invention, the metal reinforcements are overmoulded when moulding the functional part, and then the array of ribs is snapped into the metal reinforcements.

According to a first version of this embodiment, the metal reinforcements include at least one overmoulded clip produced when moulding the functional part, this clip being used for snap-fastening the array of ribs.

According to another version, the array of ribs includes shaped snap-fastening pieces capable of being snapped onto panels with flanged edges of the metal reinforcements.

In a second embodiment of the invention, the array of ribs and the functional part are produced simultaneously by moulding a plastic, and the metal reinforcements are snapped onto the array of ribs.

According to a first version of this embodiment, the metal reinforcement includes at least one hole into which a shaped catching piece, produced in the array of ribs, penetrates.

The elasticity needed for the snap-fastening may result from the shaped catching piece integral with the array of ribs or from the edges of the hole in the metal reinforcement.

In a preferred version, the catching piece protudes from the intersection of two ribs of the array of ribs. Shrink marks may then be avoided on the side of the rigid assembly opposite the metal reinforcement, said side thus being able to constitute a visible skin, and possibly a painted piece.

In order to limit the bulkiness of the catching piece protruding from the intersection of the ribs, said catching piece may be shaped as a cross whose legs are strictly comprised in the thickness of the ribs. Thus, the catching piece shows an overall diameter broader than the thickness of the ribs but does not thicken said ribs in the area of their intersection.

BRIEF DESCRIPTION OF THE DRAWINGS

For the purpose of making the invention more clearly understood, the embodiments thereof will now be described, these being given by way of non-limiting examples, with reference to the appended drawing in which:

FIG. 1 is a back perspective view of a rigid assembly consisting of an array of stiffening ribs for a specialized front wall according to a first embodiment;

FIG. 2 is a front view of a rigid assembly consisting of three metal reinforcements;

FIG. 3 is a front view of the reinforcements in FIG. 2, these being overmoulded with the functional parts of the specialized front wall;

FIG. 4 is a back view of the specialized front wall consisting of the overmoulded reinforcements in FIG. 3, to which the array of ribs in FIG. 1 has been attached;

FIGS. 8 to 13A, 13B and 13C illustrate various ways of snap-fastening the array of ribs to the metal reinforcement.

DETAILED DESCRIPTION OF PREFERRED EMBODIMENTS

Figure 5:
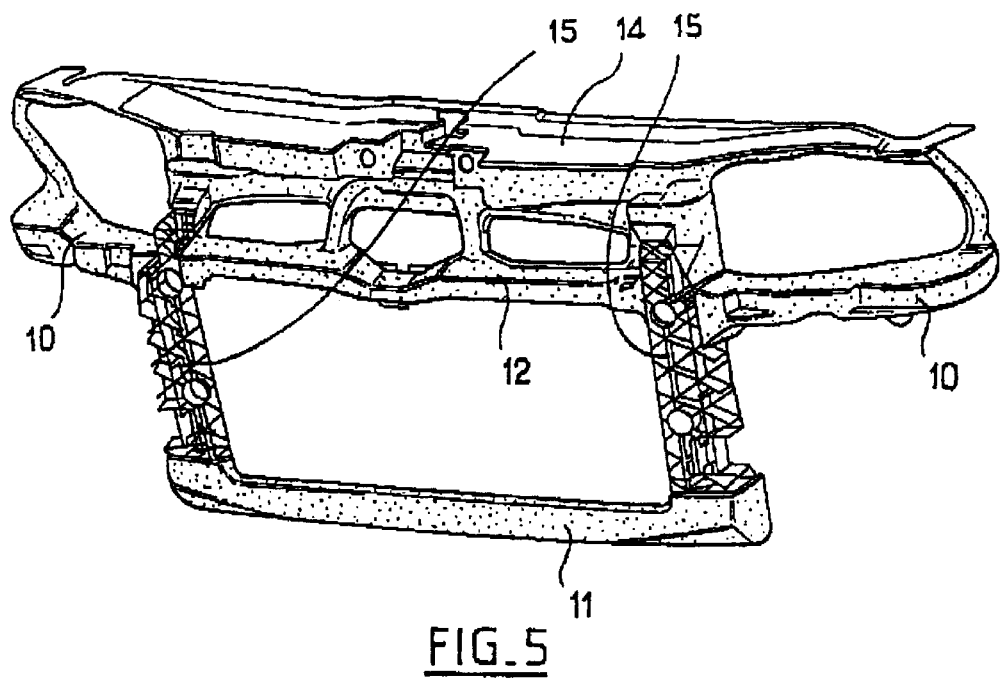
FIG. 5 is a front view of a one-piece part of a specialized front wall according to a second embodiment, consisting of a functional part and an array of ribs.

The array of ribs 1 shown in FIG. 1 is produced by injecting polypropylene into an injection mould intended for this purpose.

Optionally, reinforcing fibres may be incorporated into the plastic in order to increase the stiffness of the array of ribs obtained, this array constituting a first rigid assembly within the meaning of the invention, consisting of an upper cross-member 6 and two pillars 4.

Metal reinforcements 2, shown in FIG. 2, constitute a second rigid assembly within the meaning of the invention.

These metal reinforcements 2 are obtained by cold deformation or stamping of metal sheets in order to obtain two pillars 3 corresponding to the pillars 4 of the array of ribs and an upper cross-member 5, also present as 6 on the array of ribs, the said upper cross-member 5 extending on either side of the pillars 3 in order to join, on the vehicle, the body wing reinforcements (not shown).

The metal reinforcements 2 are overmoulded with plastic, as may be seen in FIG. 3, in order to provide a one-piece component comprising, on the one hand, the metal reinforcements as a rigid assembly belonging to the structural part of the specialized front wall and, on the other hand, overmoulded parts 7, 8, 9 constituting the functional part of the specialized front wall.

The overmoulded parts 7, 8, 9 define, in particular, housings 7 for the optical systems, a radiator support 9 and a lower beam 8.

Although such is not the primary function of the functional part, the latter also includes ribs, especially in its part 9 below the upper cross-member 5, the purpose of which is to stiffen the part supporting the radiator and not to constitute a structural element of the vehicle.

As may be seen in FIG. 4, the array of ribs 1, which constitutes the other rigid assembly of the structural part of the specialized front wall, is snapped via the rear into the metal reinforcements 2 in order to form a particularly strong, although highly functional, specialized front wall.

It will be understood that the production of such a specialized front wall involves only processes that are simple to employ, thereby ensuring a relatively low manufacturing cost.

Figure 6:
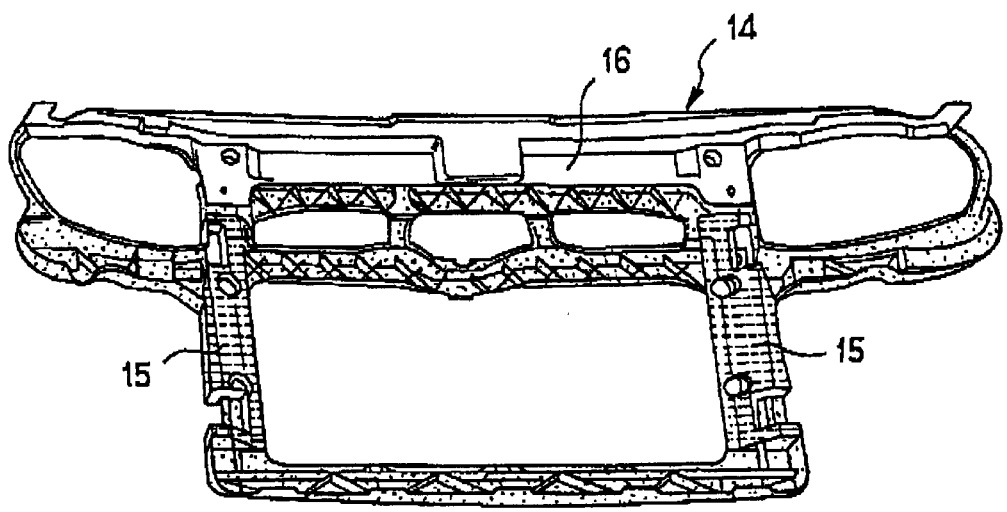
FIG. 6 is a back view of the one-piece part in FIG. 5, after an upper metal reinforcement has been attached to the upper cross-member of the array of ribs.
Figure 7:
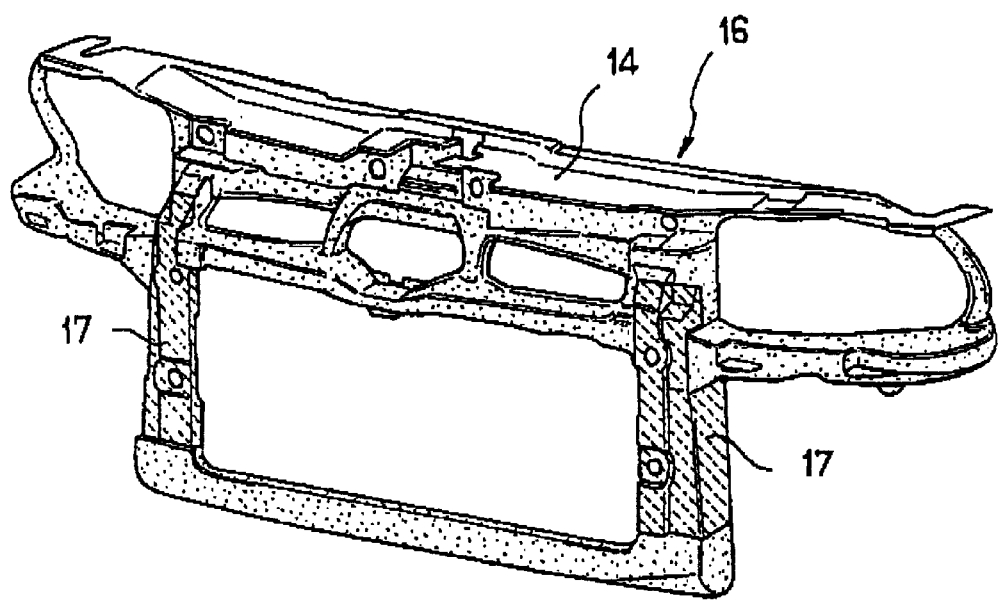
FIG. 7 is a front view of the one-piece part in FIG. 5, after two vertical metal reinforcements have been attached to the pillars of the array of ribs.

In the second embodiment described in FIGS. 5 to 7, the one-piece component of the specialized front wall comprises a functional part 10, 11, 12 and an array of ribs, which comprises an upper cross-member 14 and two pillars 15.

This one-piece component, which is shown in FIG. 5, has the same shape as the specialized front wall described above. It is obtained by injection moulding polypropylene, especially fibre-reinforced polypropylene.

In this one-piece component, the functional parts 10, 11, 12, which correspond to the overmoulded parts of the component in FIG. 3, and the structural parts 14, 15, which correspond to the array of ribs in FIG. 1, may be clearly distinguished.

Attached to this one-piece component are metal reinforcements 16, 17, identical to those in FIG. 2.

In upper metal reinforcement 16 is snapped onto the cross-member 14 of the array of ribs via the rear, as may be seen in FIG. 6, whereas that of the two vertical metal reinforcements 17 are snapped onto the pillars 15 of the array of ribs via the front, as shown in FIG. 7.

In this second embodiment it may be seen that the manufacture of the specialized front wall is just as simple and inexpensive.

FIG. 8 shows a part of the metal reinforcement 2 onto which snap-fastening clips 19 have been overmoulded.

This overmoulding operation may be carried out at the same time as the overmoulding of the functional parts of the specialized front wall in the first embodiment, in order to obtain the one-piece component in FIG. 3.

The snap-fastening clips are used for retaining the array of ribs 1, as may be seen in FIG. 9.

FIGS. 10A, 10B and 10C illustrates the way in which the metal reinforcements 17 in FIG. 7 are fastened to the pillars 15 of the one-piece component of the second embodiment, shown in FIG. 5.

The pillar 15 is provided with a rigid stud 20, while the metal reinforcement 17 has a clover leaf-shaped opening 21 which is obtained from a central circular hole 22 bordered by three peripheral circular holes 23, which leave between them three resilient gripping teeth 24. The planar area of the clover leaf-shaped opening 21 is slightly curved.

The stud 20 of the array of ribs has a diameter slightly larger than that of the central hole 22.

Upon insertion, the resilient teeth 24 move apart in order to allow insertion of the stud, by deforming rearwards, in the direction of the curvature of the planar area.

The reverse movement of the metal reinforcement is made impossible by the fact that the teeth can no longer be deformed forwards in order to release the stud.

The position of stud 20 is choosen so as to minimize the quantity of material necessary for its molding. Due to the draft of the mold, the basis of the ribs and stud are larger at the opposite side of the pillar 15, in the front of the vehicle, and the additional material resulting from the presence of the stud is not neglectable.

This is the reason why stud 20 is positioned at the intersection of the ribs.

Figure 13A:
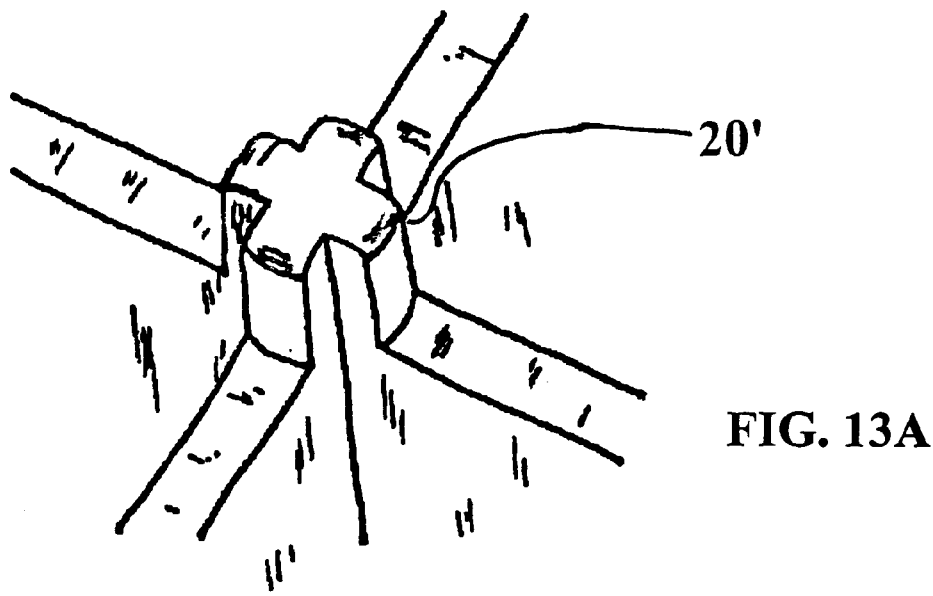
Figure 13C:
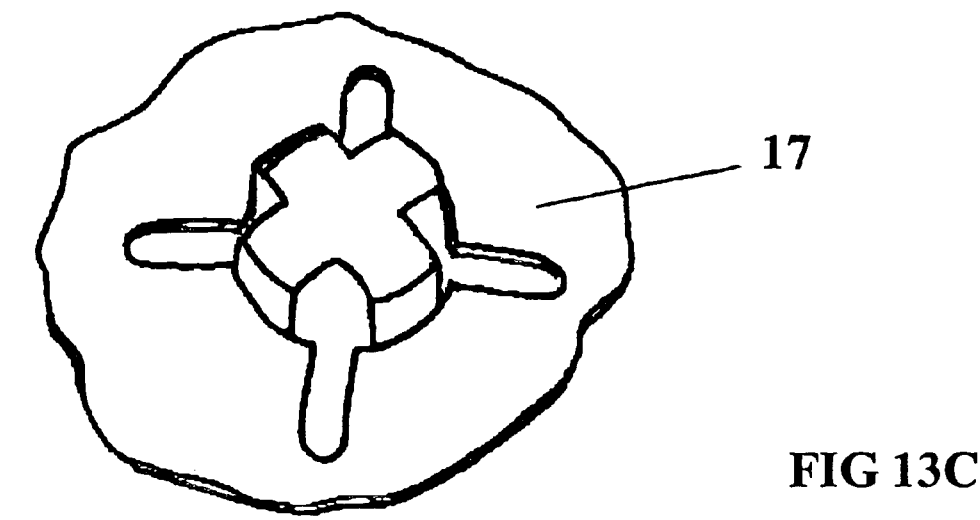
Figure 13B:
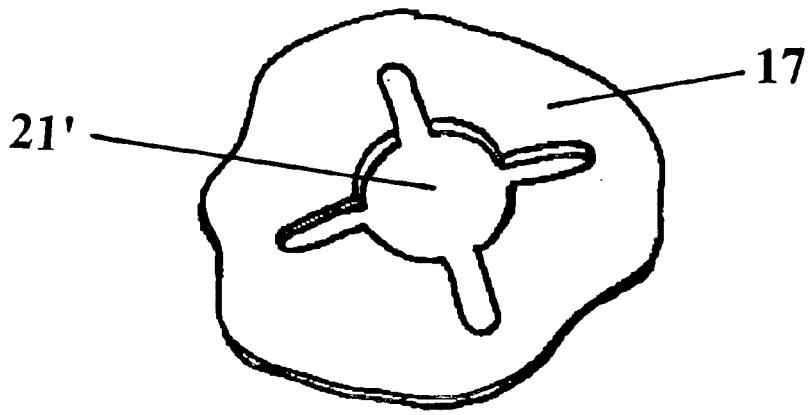

In the embodiment of FIGS. 13A, 13B and 13C, stud 20' is reduced to a cross whose thickiness is the same as for the ribs.

The bulkiness of stud 20' is even smaller, which contributes to the elimination of shrink marks at the basis of the pillar.

In this embodiment, the reduced lateral side of the stud 20' resting on the metal reinforcement 17 permits to cut a simpler hole 21' in said reinforcement, without providing for a clover leaf-shaped opening as in FIG. 10.

In another embodiment (not shown), the hole 21' is a mere circular opening whose edge is turned in the direction of the insertion of the stud and the stud 20' is shaped as a cross.

As in the previous embodiments, the edge of the hole bites the plastic stud and retains the metal reinforcement of the pillar.

The means of snapping the metal reinforcement 16 onto the cross-member 14 of the array of ribs, which is illustrated in FIG. 11, consists of two resilient blades 25 terminating in hooks 26 which penetrate and move apart in a hole 27 of the metal reinforcement.

FIG. 12 illustrates another way of snapping the array of ribs 1 in FIG. 1 into the metal reinforcements 2 in FIG. 2, by virtue of a suitable shape of one of the edges 28 of the array of ribs 1, while the metal reinforcements 2 have a flanged edge 29.

We claim:

1. A motor vehicle structural component, with a specialized front wall, comprising a functional part made of moulded plastic to support functional members of the vehicle and a structural part to withstand the various mechanical stresses generated by use of the vehicle, the structural part comprising a combination of two rigid assemblies, the assemblies comprising an array of stiffening ribs, and metal reinforcements, wherein the functional part and one of the rigid assemblies are made as one piece when moulding the plastic functional part, while the other rigid assembly is attached to the first rigid assembly to which it is fixed by snap-fastening, wherein the array of ribs and the functional part are produced simultaneously by moulding a plastic, and the metal reinforcements are snapped onto the array of ribs, the metal reinforcement includes at least one hole into which a shaped catching piece, produced in the array of ribs, penetrates, and the shaped catching piece is positioned at the intersection of two ribs.

2. A motor vehicle structural component, with a specialized front wall, comprising a functional part made of moulded plastic to support functional members of the vehicle and a structural part to withstand the various mechanical stresses generated by use of the vehicle, the structural part comprising a combination of two rigid assemblies, the assemblies comprising an array of stiffening ribs, and metal reinforcements, wherein the functional part and one of the rigid assemblies are made as one piece when moulding the plastic functional part, while the other rigid assembly is attached to the first rigid assembly to which it is fixed by snap-fastening, wherein the array of ribs and the functional part are produced simultaneously by moulding a plastic, and the metal reinforcements are snapped onto the array of ribs, the metal reinforcement includes at least one hole into which a shaped catching piece, produced in the array of ribs, penetrates, and the shaped catching piece is positioned at the intersection of two ribs and shaped as a cross whose legs are strictly comprised in the thickness of the ribs.

* * * * *

UNITED STATES PATENT AND TRADEMARK OFFICE
CERTIFICATE OF CORRECTION

PATENT NO.    : 6,547,317 B1
DATED         : April 15, 2003
INVENTOR(S)   : Cheron et al.

Page 1 of 1

It is certified that error appears in the above-identified patent and that said Letters Patent is hereby corrected as shown below:

<u>Title page,</u>
Item [75], Inventors, should read: -- Hugues Cheron, (Meximieux, FR);
Frederic Copier, (Lagnieu, FR);
Johnny Busolin, (Maillat, FR);
Yves Alphand, (Oyonnax, FR);
Frederic Pierrot, (Lagnieu, FR) --

Item [73], Assignee, should read: -- Compagnie Plastic Omnium S.A., Lyon, (FR) --

Signed and Sealed this

Twenty-third Day of September, 2003

JAMES E. ROGAN
*Director of the United States Patent and Trademark Office*